United States Patent
Trifilo et al.

(10) Patent No.: US 11,246,009 B1
(45) Date of Patent: Feb. 8, 2022

(54) LOCATION TRACKING CONSENT MANAGEMENT

(71) Applicant: Cisco Technology, Inc., San Jose, CA (US)

(72) Inventors: Giacomo Trifilo, Pully (CH); Jerome Henry, Pittsboro, NC (US); Thomas Vegas, Gland (CH); Anirban Karmakar, Vaud (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/989,470

(22) Filed: Aug. 10, 2020

(51) Int. Cl.
| | |
|---|---|
| *H04W 24/00* | (2009.01) |
| *H04W 4/029* | (2018.01) |
| *H04W 88/08* | (2009.01) |
| *H04W 4/02* | (2018.01) |
| *H04W 4/021* | (2018.01) |

(52) U.S. Cl.
CPC ........... *H04W 4/029* (2018.02); *H04W 4/021* (2013.01); *H04W 4/023* (2013.01); *H04W 88/08* (2013.01)

(58) Field of Classification Search
CPC ..... H04W 4/029; H04W 4/021; H04W 88/08; H04W 4/023
USPC ....................................................... 455/456.1
See application file for complete search history.

(56) References Cited

U.S. PATENT DOCUMENTS

| | | | |
|---|---|---|---|
| 10,405,147 | B1 * | 9/2019 | Mahmoud ............. H04W 64/00 |
| 2006/0285514 | A1 * | 12/2006 | Hoerl ...................... H04L 43/00 370/328 |
| 2011/0030037 | A1 * | 2/2011 | Olshansky .............. H04L 63/10 726/4 |
| 2018/0160271 | A1 * | 6/2018 | Vutukuri ............. H04W 12/069 |
| 2018/0189810 | A1 * | 7/2018 | Greenberger ...... G06Q 30/0203 |
| 2019/0130019 | A1 * | 5/2019 | De ....................... H04L 61/6004 |
| 2020/0167724 | A1 * | 5/2020 | Klitenik ............... H04B 17/318 |

\* cited by examiner

*Primary Examiner* — Tanmay K Shah
(74) *Attorney, Agent, or Firm* — Merchant & Gould P.C.

(57) ABSTRACT

Location tracking consent management may be provided. A zone in a network may be configured with a corresponding tracking type. Next a computing device associated with the zone may be enabled to transmit an information element indicating the tracking type configured for the zone. A client device may then be allowed to disallow tracking of the client device based on the tracking type.

20 Claims, 3 Drawing Sheets

LOCATION TRACKING CONSENT MANAGEMENT

TECHNICAL FIELD

The present disclosure relates generally to location tracking consent.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
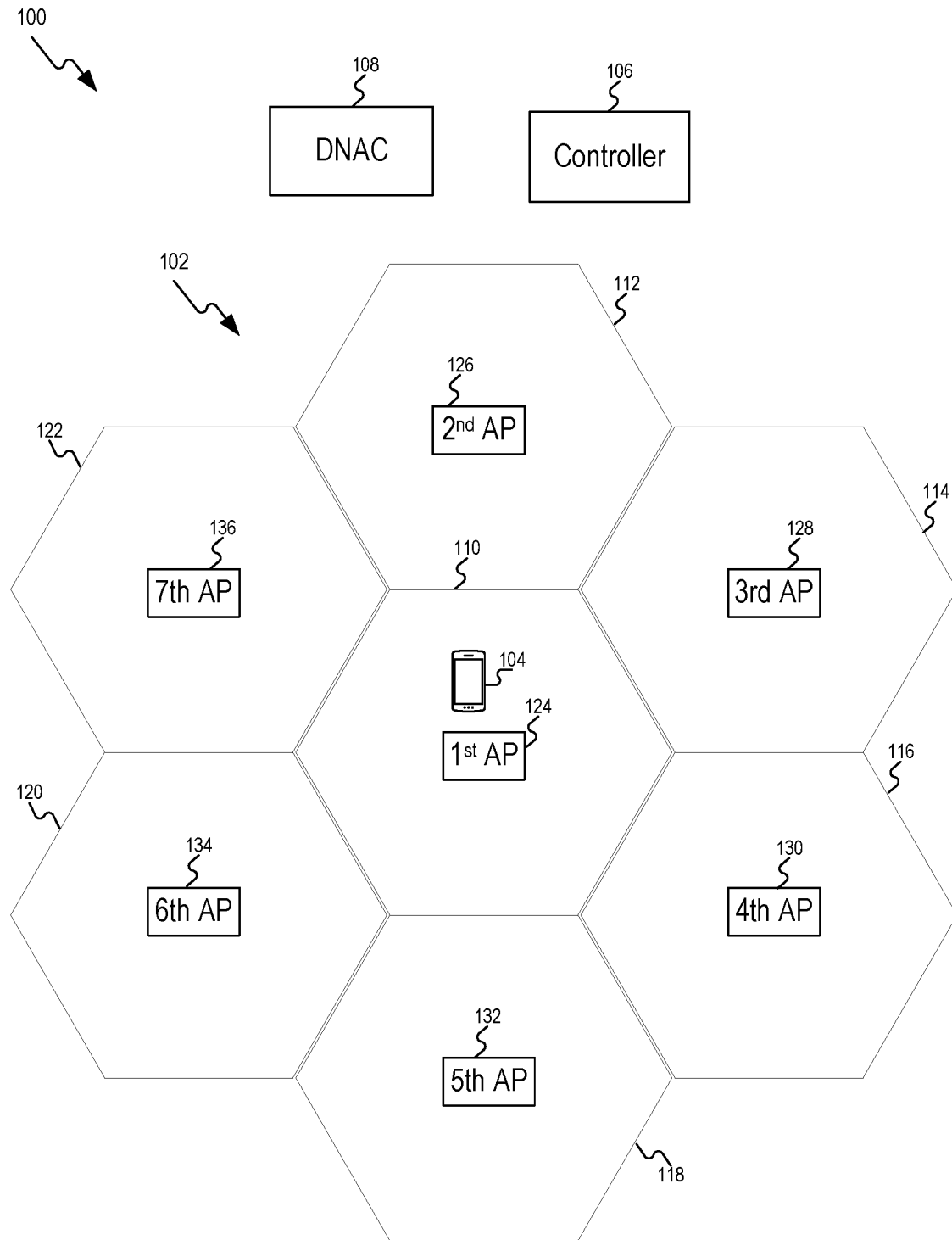
FIG. 1 is a block diagram of wireless network.

Location tracking consent management may be provided. A zone in a network may be configured with a corresponding tracking type. Next, a computing device associated with the zone may be enabled to transmit an information element indicating the tracking type configured for the zone. A client device may then be allowed to disallow tracking of the client device based on the tracking type.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The European Union's (EU's) General Data-Protection Regulation (GDPR) may have impacted the way businesses collect, store, and manage personal information about an end user. Collecting and using personal data from EU citizens and residents may follow relevant notices for data processing at least under Article 6 of the GDPR. For this reason, publishers and website owners may need to obtain freely given, specific, informed, and unambiguous user consent when collecting and using cookies for advertising and marketing purposes for example.

The same concern may exist at other Open Systems Interconnection (OSI) layers, including Layer 2, which may affect location services running, for example, on Software-Defined Network (SDN) controllers. GDPR may apply for cases where a user's personal information may be identified.

In Wi-Fi, when set to an unassociated state, some user devices (e.g., Stations (STAs)) may use randomized Media Access Control (MAC) addresses in an attempt to decouple a device identifier from a user identity. Other user devices may use their fixed MAC. User devices that use randomized MAC addresses may attempt to rotate the MAC at unpredictable intervals. However, learning engines may reverse this process, defeating the device identifier from user identity decoupling effort. Such effort violates GDPR provisions, if the location of the device becomes synonymous with the user location obtained without the user consent.

Once associated, some user devices may use a stable MAC address (randomized or real). In most cases, running location services may result in loose or strict correlation between the located MAC address and the user of the associated device. Each time such correlation becomes possible, GDPR article 11 may mandate that user consent be expressed. Accordingly there may be a need for a process for location-based services solutions to provide correlation information to the users of devices that are located. Embodiments of the disclosure may ensure data collection authorization as it relates to user and device location inside enterprises/public WLANs through specific advertisement configured, for example, from an SDN controller.

Embodiments of the disclosure may use an SDN controller as a location tracking consent management platform. Processes consistent with embodiments of the disclosure may allow a network administrator to express zones and Service Set Identifiers (SSIDs) where location tracking may be performed (e.g., presence, individual location, with or without individual MAC address obfuscation), and may allow the user to option in or option out of the location tracking system. With this process, location systems may become GDPR compliant while allowing for location tracking and analytics.

FIG. 1 shows a block diagram of wireless network 100 for providing location tracking consent management. As shown in FIG. 1, wireless network 100 may comprise a plurality of cells 102 in which a client device 104 may roam. Plurality of cells 102 may have a corresponding plurality of wireless Access Points (APs) that may establish a Wireless Local Area Network (WLAN) in order to provide client device 104 network connectivity.

Site specific policies may be provisioned on a Wireless Local Area Network controller (WLC) 106 for the plurality of APs to join wireless network 100 and to allow WLC 106 to control wireless network 100. Consistent with embodiments of the disclosure, a Digital Network Architecture Center (DNAC) controller 108 (i.e., a Software-Defined Network (SDN) controller) may configure information for wireless network 100 in order to provide location tracking consent management consistent with embodiments of the disclosure.

Plurality of cells 102 may comprise a first cell 110, a second cell 112, a third cell 114, a fourth cell 116, a fifth cell 118, a sixth cell 120, and a seventh cell 122. First cell 110 may correspond to a first AP 124, second cell 112 may correspond to a second AP 126, third cell 114 may correspond to a third AP 128, fourth cell 116 may correspond to a fourth AP 130, fifth cell 118 may correspond to a fifth AP 132, sixth cell 120 may correspond to a sixth AP 134, and seventh cell 122 may correspond to a seventh AP 136.

As stated above, wireless network 100 may comprise Wi-Fi APs that may be configured to support a wireless (e.g., Wi-Fi) hotspot. The Wi-Fi hotspot may comprise a physical location where a user, operating client device 104, may obtain access to wireless network 100 (e.g., Internet access), using Wi-Fi technology, via a WLAN using a router connected to a service provider.

In other embodiments of the disclosure, rather than APs, devices may be used that may be connected to a cellular network that may communicate directly and wirelessly with end use devices (e.g., client device 104) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

Client device 104 may comprise, but is not limited to, a phone, a smartphone, a digital camera, a tablet device, a laptop computer, a personal computer, a mobile device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of wireless network 100 (e.g., controller 106, DNAC 108, first AP 124, second AP 126, third AP 128, fourth AP 130, fifth AP 132, sixth AP 134, and seventh AP 136) may be practiced in hardware and/or in software (including firmware, resident software, microcode, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of wireless network 100 may be practiced in a computing device 300.

Figure 2:
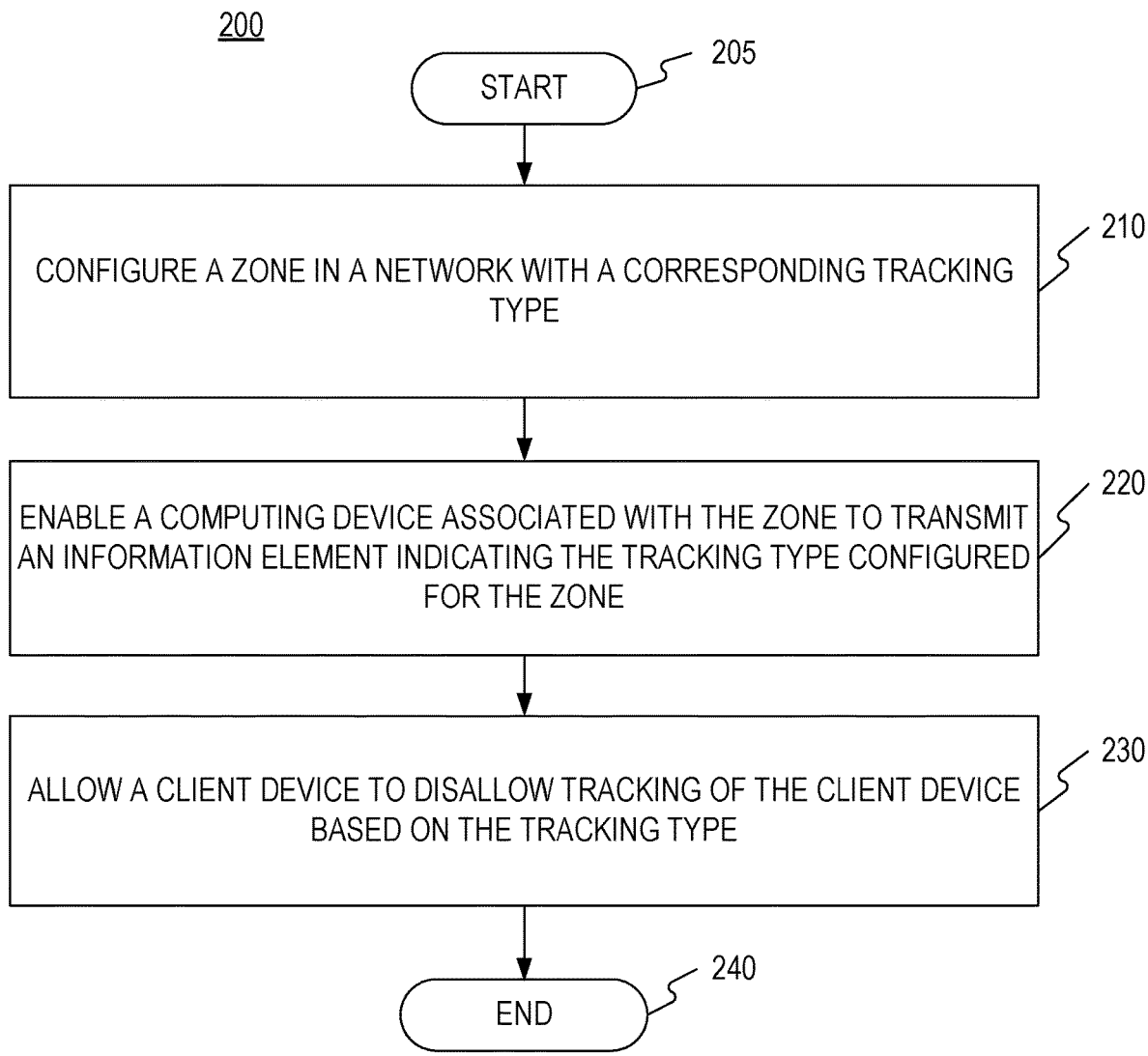
FIG. 2 is a flow chart of a method for providing location tracking consent management.

FIG. 2 is a flow chart setting forth the general stages involved in a method 200 consistent with embodiments of the disclosure for providing location tracking consent management. Method 200 may be implemented using DNAC 108 as described in more detail below with respect to FIG. 1. Ways to implement the stages of method 200 will be described in greater detail below.

Method 200 may begin at starting block 205 and proceed to stage 210 where DNAC 108 may configure a zone in wireless network 100 with a corresponding tracking type. For example, on DNAC 108, a system administrator may configure zones. However, instead of performing location configuration, the administrator may also configure location information parameters. While any number of zones types may be used with embodiments of the disclosure, the following four zone types may be used. A first zone type may do no location tracking. A second zone type may use analytics and or presence (e.g., a general zone) with individual MAC address tracking for example. A third zone type may include individual client device location tracking. A fourth zone type may use analytics and or presence or individual device location, with data anonymization (e.g., GDPR Article 11).

Correlation may allow for the determination of a statistical relationship between an address (e.g., a MAC address), a user device, and a user of the user device. As such, a user device in the second zone type as described above may become individually located (e.g., third zone type described above) if there are a few user devices in the zone. Consistent with embodiments of the disclosure, a zone of the second zone type may automatically become the third zone type, for example, when a small (configurable value in DNAC 108) number of devices are detected in the zone.

The zones may be general or associated to specific SSIDs or systems. For example, in a shopping mall (e.g., where the shopping mall's owner deployed and controls the APs in a network), some tenants (e.g., store owners) may buy a zone location type service (e.g., "no location", "analytics", or "individual device location" services). As such, their individual SSIDs may be matched accordingly (as per below). Other environments may have uniformity of zone type across an entire domain. Moreover, zones and SSIDs may be associated with one or more APs in wireless network 100.

From stage 210, where DNAC 108 configures the zone in wireless network 100 with the corresponding tracking type, method 200 may advance to stage 220 where DNAC 108 may enable a computing device (e.g., first AP 124) associated with the zone to transmit an Information Element (IE) indicating the tracking type configured for the zone. In other words, one or more APs associated with a zone (and a SSID) may, for example, publish a tracking IE in its beacons, probe responses, and association responses. For example, in one embodiment, the IE may extend the "no-LMR element" defined in the Institute of Electrical and Electronics Engineers (IEEE) 802.11az standard. This element may be intended to signal, in IEEE 802.11az, that the infrastructure may not ask a client device performing self-location (e.g., Fine Time Measurements (FTM), ranging) to share the result of its location computation to the infrastructure. Embodiments of the disclosure may reuse this element to signal that the infrastructure is not performing location of any kind (e.g., first zone for that SSID). This IEEE 802.11az feature may be useful because client device vendors may intent to rotate random MAC address differently based on the infrastructure intent (e.g., no location may result in slow or no rotation; LMR-sharing mandate may result in fast MAC rotation).

In other embodiments of the disclosure, the no-LMR IE may include more than a binary (e.g., I/O). The full IE may be used to express zones of first zone type, second zone type, third zone type, and fourth zone type as described above (e.g., over 2 bits). Other frames may be used for the same purpose. This way, the client device may know what type of tracking may be performed in the location (i.e., zone) for each SSID.

Once DNAC 108 enables the computing device (e.g., first AP 124) associated with the zone to transmit the information element indicating the tracking type configured for the zone in stage 220, method 200 may continue to stage 230 where DNAC 108 may allow client device 104 to disallow tracking of client device 104 based on the tracking type. For example, DNAC 108 may receive upstream frames (e.g., probe requests, FTM) from client device 104 with a do not track bit set, thus instructing the infrastructure (e.g., DNAC 108) to not retain client device 104's MAC address, thus making the infrastructure GDPR-compliant. As client device 104 rotates its MAC address, it may repeat the do not track bit for each new MAC address. When zones of fourth zone type are possible, in some embodiments, the infrastructure (e.g., DNAC 108) may convert the detected MAC address to an anonymous token. In one embodiment, client device 104 may also express a "track but obfuscate" bit, that may allow the infrastructure to count client device 104 and record its position, but obfuscate its MAC address at the AP level (e.g., convert the detected MAC address to a random 48-bit token).

In another embodiment, client device 104 may change the MAC address rotation pattern dynamically, to increase obfuscation of client device 104. In other words, client device 104 may switch to a dynamic MAC address rotation process upon tracking detection.

In yet another embodiment, DNAC 108 may surface to the user of client device 104 a "tracking" warning on client device 104. This warning may appear regardless of client device 104's association state (i.e., associated with an AP or not associated with an AP). The user can then accept or decline the tracking depending on the mode (e.g., presence verses individual). The choice may be remembered for the SSID, and/or for the SSID/location pair. If the user options out, client device 104 may start sending do not track bits as described above. Client device vendors may choose to option out automatically or by default.

At DNAC 108, a count may be kept of devices that optioned in and optioned out. The goal may not be to track users against their will, but to display information in the form, for example, "425 devices in this zone, you are tracking location of 70% of these devices, 30% refused tracking").

Embodiments of the disclosure may allow the infrastructure (e.g., DNAC 108) to stay GDPR compliant while allowing for location tracking in public venues. Once DNAC 108 allows client device 104 to disallow tracking of client device 104 based on the tracking type in stage 230, method 200 may then end at stage 240.

Figure 3:
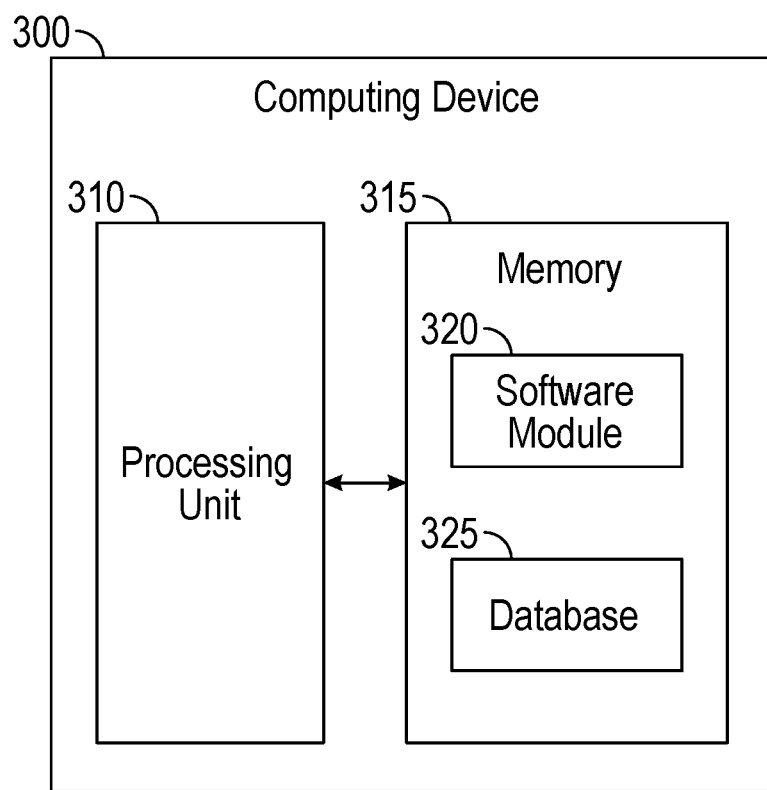
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing location tracking consent management as described above with respect to FIG. 2. Computing device 300, for example, may provide an operating environment for controller 106, DNAC 108, first AP 124, second AP 126, third AP 128, fourth AP 130, fifth AP 132, sixth AP 134, or seventh AP 136. Controller 106, DNAC 108, first AP 124, second AP 126, third AP 128, fourth AP 130, fifth AP 132, sixth AP 134, and seventh AP 136 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    configuring at least two zones in a network with a corresponding tracking type, wherein configuring the at least two zones with the corresponding tracking type comprises:
        configuring a first zone with a first tracking type that allows no tracking of a client device, and
        configuring a second zone with a second tracking type that allows tracking of the client device;
    enabling a computing device associated with each of the at least two zones to transmit an information element indicating the tracking type configured for each of the at least two zones; and
    allowing the client device in the first zone to disallow tracking of the client device based on the first tracking type.

2. The method of claim 1, wherein configuring the at least two zones comprises configuring each of the at least two zones associated with a predetermined Service Set Identifier (SSID).

3. The method of claim 1, wherein the tracking type considers at least one of the following parameters: presence of the client device; individual location of the client device; and with or without individual address obfuscation.

4. The method of claim 1, wherein allowing the client device to disallow tracking of the client device according to the first tracking type comprises:
    receiving a do not track indication from the client device; and
    not retaining an address of the client device in response to receiving the do not track indication.

5. The method of claim 1, wherein allowing the client device to disallow tracking of the client device according to the first tracking type comprises changing an address rotation pattern of the client device dynamically to increase obfuscation of the client device.

6. The method of claim 1, wherein allowing the client device to disallow tracking of the client device according to the first tracking type comprises:
    providing a tracking warning to the client device;
    receiving a do not track indication from the client device in response to providing the tracking warning; and
    not retaining an address of the client device in response to receiving the do not track indication.

7. The method of claim 1, wherein the computing device comprises an Access Point (AP).

8. An system comprising:
    a memory storage; and
    a processing unit coupled to the memory storage, wherein the processing unit is operative to:
        configure at least two zones in a network with a corresponding tracking type, wherein the processing unit being operative to configure the at least two zones with the corresponding tracking type comprises the processing unit being operative to:
            configure a first zone with a first tracking type that allows no tracking of a client device, and
            configure a second zone with a second tracking type that allows tracking of the client device;
        enable a computing device associated with each of the at least two zones to transmit an information element indicating the tracking type configured for each of the at least two zones; and
        allow the client device to disallow or allow tracking of the client device based on the tracking type.

9. The system of claim 8, wherein the processing unit being operative to configure the at least two zones comprises the processing unit being operative to configure each of the at least two zones associated with a predetermined Service Set Identifier (SSID).

10. The system of claim 8, wherein the tracking type considers at least one of the following parameters: presence of the client device; individual location of the client device; and with or without individual address obfuscation.

11. The system of claim 8, wherein the processing unit being operative to allow the client device to disallow or allow tracking of the client device according to the tracking type comprises the processing unit being operative to:
    receive a do not track indication from the client device; and not retain an address of the client device in response to receiving the do not track indication.

12. The system of claim 8, wherein the processing unit being operative to allow the client device to disallow or allow tracking of the client device according to the tracking type comprises the processing unit being operative to change an address rotation pattern of the client device dynamically to increase obfuscation of the client device.

13. The system of claim 8, wherein the processing unit being operative to allow the client device to disallow or allow tracking of the client device according to the tracking type comprises the processing unit being operative to:
provide a tracking warning to the client device;
receive a do not track indication from the client device in response to providing the tracking warning; and
not retain an address of the client device in response to receiving the do not track indication.

14. A non-transitory computer-readable medium that stores a set of instructions which when executed perform a method comprising:
configuring at least two zones in a network with a corresponding tracking type, wherein configuring the at least two zones with the corresponding tracking type comprises:
configuring a first zone with a first tracking type that allows no tracking of a client device, and
configuring a second zone with a second tracking type that allows tracking of the client device;
enabling a computing device associated with each of the at least two zones to transmit an information element indicating the tracking type configured for each of the at least two zones; and
allowing the client device in the first zone to disallow tracking of the client device based on the first tracking type.

15. The non-transitory computer-readable medium of claim 14, wherein configuring the at least two zones comprising configuring each of the at least two zones associated with a predetermined Service Set Identifier (SSID).

16. The non-transitory computer-readable medium of claim 14, wherein the tracking type considers at least one of the following parameters: presence of the client device; individual location of the client device; and with or without individual address obfuscation.

17. The non-transitory computer-readable medium of claim 14, wherein allowing the client device to disallow tracking of the client device according to the first tracking type comprises:
receiving a do not track indication from the client device; and
not retaining an address of the client device in response to receiving the do not track indication.

18. The non-transitory computer-readable medium of claim 14, wherein allowing the client device to disallow tracking of the client device according to the first tracking type comprises change an address rotation pattern of the client device dynamically to increase obfuscation of the client device.

19. The non-transitory computer-readable medium of claim 14, wherein allowing the client device to disallow tracking of the client device according to the first tracking type comprises:
providing a tracking warning to the client device;
receiving a do not track indication from the client device in response to providing the tracking warning; and
not retaining an address of the client device in response to receiving the do not track indication.

20. The non-transitory computer-readable medium of claim 14, wherein the computing device comprises an Access Point (AP).

\* \* \* \* \*